J. D. CAMPBELL.
VEHICLE TIRE.
APPLICATION FILED NOV. 20, 1917.
1,277,850.
Patented Sept. 3, 1918.
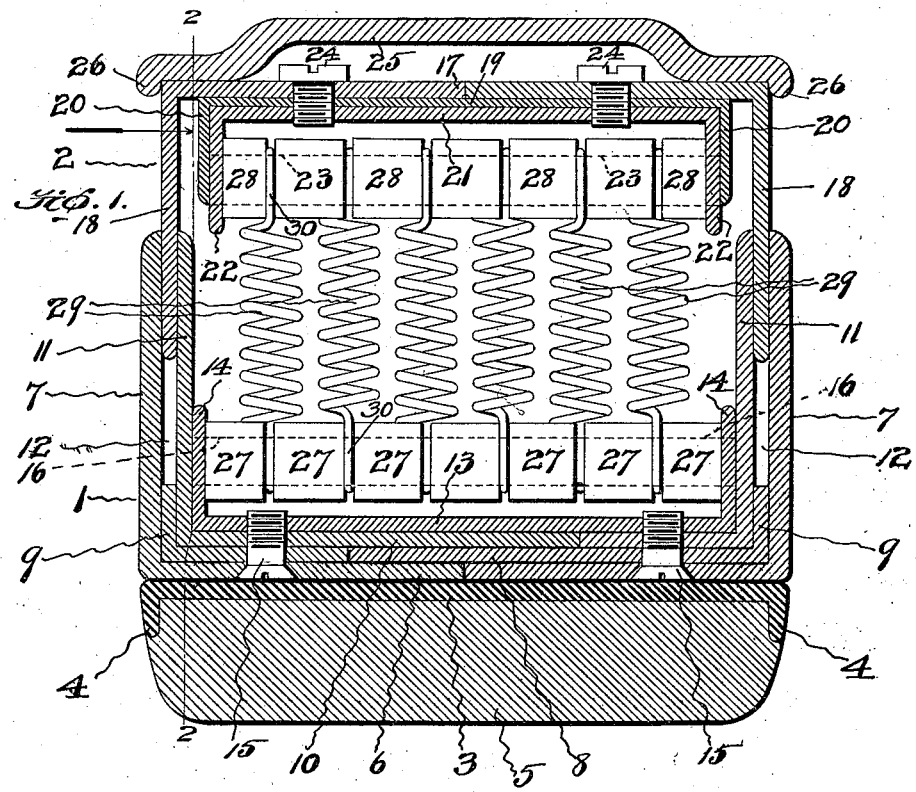
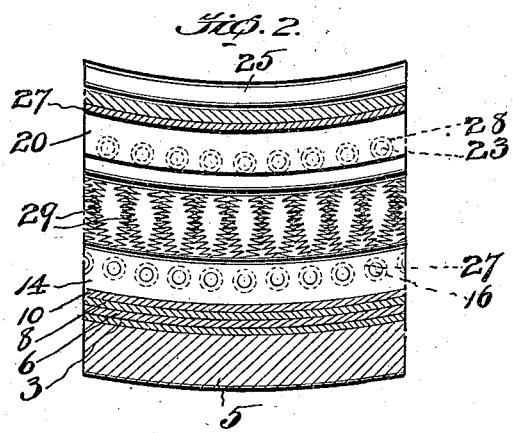
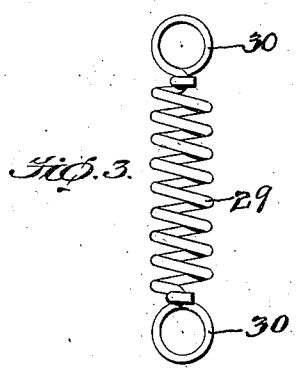
Inventor
John D. Campbell
Blackwood Bros
Attorneys.

UNITED STATES PATENT OFFICE.

JOHN D. CAMPBELL, OF SEA BRIGHT, NEW JERSEY.

VEHICLE-TIRE.

1,277,850.

Specification of Letters Patent.

Patented Sept. 3, 1918.

Application filed November 20, 1917. Serial No. 202,928.

*To all whom it may concern:*

Be it known that I, JOHN D. CAMPBELL, residing at Sea Bright, in the county of Monmouth and State of New Jersey, a citizen of the United States, have invented certain new and useful Improvements in Vehicle-Tires; and I do hereby declare the following to be a full, clear, and exact description of the invention, such as will enable others skilled in the art to which it pertains to make and use the same.

My invention relates to vehicle tires, particularly to motor truck vehicle tires.

It has for its object to provide a tire of this character which obviates the necessity for the employment of pneumatic, cushion or resilient tires, by serving all the purposes of wheels supplied with such tires and besides having many additional advantageous purposes.

It further has for its object to provide a tire of this character having a maximum amount of carrying power with a minimum amount of metal in its construction.

It has for a further object to provide a tire of this character having means whereby when employed on the driving wheel of a motor vehicle the power will be gradually applied thereto in either direction, thus reducing the strain upon the driving shaft and the driving wheel and reducing the jar to vehicles incident to starting in either direction or stopping.

It has for a further object to provide a tire of this character having means whereby its working parts are protected from injurious matter, such as dirt, stones and water and yet allow of easy access for inspection and repair.

It further has for its object to provide a tire of this character having means whereby the parts thereof which are to be subjected to the greatest strain are braced, thus making the wheel strong and rigid.

It has for a further object to provide a tire of this character with an arrangement of spring elements by which the driving power is distributed in one-half of the spring elements while they are expanded and in the other half of the spring elements while they are compressed and in reversing or braking one-half of the spring elements that were in compression become expanded and those that were expanded become compressed, thus overcoming or taking up the first sudden jar of the throwing on of the clutch.

It further has for its object to provide a tire of this character with laminated elements for the purpose of producing an elastic tire the several parts of which are adapted to return to their normal positions after the tire has come in contact with an obstacle and passed the same.

It further has for its object to provide a tire of this character which will permit the felly member to move with the movement caused by the jar of the clutch and allowing the rim to remain in its normal position on the road bed while the spring elements are overcoming the jar occasioned by the throwing on of the clutch member.

It still further has for its object to provide a tire of this character which is simple, inexpensive and durable in construction and which will run smoothly and easily under all conditions it may be subjected to, no matter how rough and uneven the roads may be.

The invention consists in the construction, combination and arrangement of the several features as more fully hereinafter described and claimed.

In the drawings:

Figure 1 is a cross-sectional view of my invention.

Fig. 2 is a fragmentary side view of my invention, some of the parts being shown in section.

Fig. 3 is a side view of one of the spring elements used in the construction of my invention.

Referring to the drawings in which like reference characters designate corresponding parts throughout the several views, 1 designates the rim member and 2 the felly member of the tire.

The rim member consists of an annular metal ring 3 having outwardly extending flanges or portions 4 between which a tread or tire 5 of hard rubber, rubber composition or other material is secured or retained in any desired manner, and a two-part angular metal ring 6 having inwardly extending flanges 7 to which the metal ring 3 is secured. Inside the metal ring 6 an annular two-part metal ring 8 is seated having inwardly extending flanges 9 which bear against the flanges 7 of the metal rings 6, and inside of the metal ring 8 a two-part metal ring 10 is seated, which, by means of the spacing ring 8 and the flanges 7 of the ring 8, form a slot or recess 12. Inside the ring 10 a metal ring 13 is seated having inwardly extending flanges 14.

Binding-screws 15 are provided for the purpose of securing the rings 6, 8, 10 and 13 rigidly together and forming a laminated structure.

A series of bolts or rods 16 is mounted at opposite ends in the flanges 14 of the ring 13 and the flanges 11 of the ring 10 serve as abutments for each end of the bolts 16 and retain the same in position without the necessity of employing nuts or other means for the purpose. The felly member consists of an annular two-part metal ring 17 having outwardly extending flanges 18 which are adapted to reciprocate in the slots or recesses 12 of the rim member and fit so closely therein that the working parts of the tire are proof against the entrance of any foreign or injurious matter, such as dirt, grit, stones, water, etc.

An annular split spring metal ring 19 is seated inside the ring 17, and is provided with outwardly extending spring flanges 20 and spaced from the flanges 18 to allow sufficient room for the reciprocation or movement of the flanges 11 of the rings 10.

Inside the ring 19 an annular ring 21 is seated, being provided with flanges 22, and a series of bolts or rods 23 is mounted at opposite ends in the flanges 22 and is held in place by means of the spring flanges 20 of the spring rings 19 without the use of nuts or other fastening means.

The ring 19 being split is adapted to be sprung over the ring 21 and closely contact with the same under spring pressure. Binding screws 24 are provided which are adapted to secure the rings 17, 19 and 21 together and thereby form a laminated structure. Screws 24 are also adapted to be removed to introduce lubricant into tire.

An annular ring 25 of any well known construction of demountable ring is mounted on the inner surface of the two-part ring 17 and is provided with lugs 26 which inclose the inner edges of the ring 17.

A series of sleeves 27 is mounted on each of the rods 16 of the rim member and a series of sleeves 28 is mounted on each of the rods 23 of the felly member.

A parallel series of compressible, extensible and retractile elements, shown in the drawings as normally open helical springs 29, is mounted on each of the rods 16 and 23 and resiliently connect the rim and felly members of the tire. The axes of the inner and outer series of springs extend in one direction, the axes of alternate springs extending in the opposite direction to the axes of the adjacent springs and crossing the axes of the adjacent springs. The springs 29 are mounted by means of eyes 30 on their ends, one eye of each spring engaging one of the bolts or rods of the felly member of the wheel and the other eye engaging one of the bolts of the rim member of the wheel.

It will be seen that by mounting the eyes of the springs 29 between adjacent sleeves the springs are spaced apart or separated and prevented from coming in contact.

The sleeves 28 are to be made of absorbent material, such, for instance, as rawhide, for the purpose of receiving and absorbing lubricant and to furnish lubricant to the series of spring elements and other parts within the tire and prevent the rusting of the parts and also render them noiseless and easy in operation.

The hard rubber tire may be attached by means of a demountable rim, or permanently attached or secured to the rim member in any desired mode or manner.

The operation of my invention is as follows:

Upon weight being placed upon the felly member 2 of the tire the flanges 18 will be moved farther into the slots or recesses of the rim member 1, extending some of the springs and compressing other of the springs in opposition to the springs being extended, and when power is applied to the felly member of the tire it will be rotated forwardly or rearwardly.

If rotated forwardly the alternate series of springs will be extended and adjacent series of springs simultaneously compressed in opposition to the springs being extended, while if rotated rearwardly the adjacent series of springs before referred to will be extended and alternate series of springs simultaneously compressed in opposition to the springs being compressed.

In either case, whether the felly member of the tire is rotated forwardly or rearwardly, by reason of the springs interposed between the felly and rim members, the felly member will rotate in advance of the rim member, thus gradually applying power to the driving wheel in either direction and reducing strain upon the driving shaft and the driving wheel and reducing the jar to the vehicle incident to starting in either direction or stopping.

I do not wish to be understood as limiting myself to the specific details of construction and arrangement as herein described and illustrated, as it is manifest that variations and modifications may be made in the features of construction and arrangement in the adaptation of the device to the various conditions of use without departing from the spirit and scope of my invention and improvements. I, therefore, reserve the right to all such variations and modifications as properly fall within the scope of my invention and the terms of the following claims.

What I claim is:—

1. In a vehicle tire, a felly member, a rim member, each of said members provided with bolts, resilient means connecting said bolts and resilient means adapted to contact with the ends of one set of said bolts and retain them in place.

2. In a vehicle tire, a felly member, a rim member, each of said members provided with a flanged ring, bolts mounted in said flanged rings, resilient means connecting said bolts and spring, means adapted to be placed over and engage said flanged rings for retaining said bolts in place.

3. In a vehicle tire, a felly member, a rim member, each of said members provided with a flanged ring, bolts mounted in the flanges of said rings, sleeves mounted on said bolts, resilient means connecting said bolts and spaced apart by said sleeves and a ring having flanges adapted to embrace the first mentioned ring and retain the bolts in place.

4. In a vehicle tire, a felly member, a rim member, each of said members provided with a flanged ring, bolts mounted in the flanges of said rings, a series of sleeves mounted on said bolts, resilient means connecting said bolts and spacing them apart and a ring having resilient flanges adapted to embrace the flanges of the first mentioned ring and retain the bolts in place.

5. In a vehicle tire, a felly member, a rim member, resilient means connecting said felly and rim members, one of said members having a grooved portion and the other member having a projecting portion extending into and movable in said grooved portion, a flanged ring carried by each of said rim and felly members, bolts mounted in the flanges of said rings and a spring ring having flanges adapted to embrace the flanges of the first mentioned rings and retain the bolts in place.

6. In a vehicle tire, a rim member, a felly member, each provided with bolts, lubricant absorbent sleeves mounted on said bolts and resilient means mounted on said bolts and spaced apart by means of the said sleeves.

7. In a vehicle tire, a rim member, a felly member, one of said members having annular rings, a ring between said rings spacing them apart and forming a groove, and the other member having an annular ring with a projecting portion extending into the slot between the first mentioned rings and movable therein, a flanged ring carried by each of said rim and felly members having bolts mounted in the flanges thereof, resilient means connecting said bolts and means adapted to embrace the flanges of the said flanged rings and retain the bolts in place.

8. In a vehicle tire, a rim member, a felly member, one of said members having a grooved portion and the other member having a projecting portion extending into and movable in said grooved portion, a ring carried by the rim member and in contact with the grooved portion and provided with flanges, bolts passing through said flanges and retained in place by the walls of the grooved portion, a ring carried by the felly member having flanges, bolts passing through said flanges, resilient means connecting said bolts, a resilient flanged ring embracing the flanges of the said ring carried by the rim member and retaining the bolts in place.

In testimony whereof, I have affixed my signature.

JOHN D. CAMPBELL.